United States Patent
Justice et al.

(10) Patent No.: US 7,030,836 B2
(45) Date of Patent: Apr. 18, 2006

(54) SYSTEM AND METHOD FOR CONFIGURING A MULTI-USER COMPUTER SYSTEM

(75) Inventors: Bradley Justice, Berkeley, CA (US); Manfred Siemsen, San Bruno, CA (US); Ian Jack, Swindon (GB)

(73) Assignee: Thinsoft, Inc., Ithaca, NY (US)

( * ) Notice: Subject to any disclaimer, the term of this patent is extended or adjusted under 35 U.S.C. 154(b) by 204 days.

(21) Appl. No.: 10/278,153

(22) Filed: Oct. 22, 2002

(65) Prior Publication Data

US 2004/0119659 A1    Jun. 24, 2004

(51) Int. Cl.
*G09G 5/00* (2006.01)

(52) U.S. Cl. .................................. 345/1.1; 345/156
(58) Field of Classification Search ................ 345/1.1, 345/1.2, 1.3, 156
See application file for complete search history.

(56) References Cited

U.S. PATENT DOCUMENTS 6,092,210 A * 7/2000 Larky et al. ................ 713/400
6,232,932 B1 * 5/2001 Thorner ...................... 345/1.3
6,367,072 B1 * 4/2002 Justice et al. ............... 717/168

FOREIGN PATENT DOCUMENTS

EP    1114981 A2 *  7/2001

* cited by examiner

*Primary Examiner*—Jimmy H. Nguyen
(74) *Attorney, Agent, or Firm*—Wall Marjama & Bilinski LLP

(57) ABSTRACT

A system and method for configuring collections of non-display, input and output devices and display devices in a multi-user computer system. Initially, the invention heuristically creates at least two collections of non-display devices, each of which includes a keyboard, by analyzing connection patterns of each of the non-display devices to the computer data buses. Display devices are added to each collection by causing a user prompt to appear on a display, and then causing the display to be associated with the collection of the keyboard that is used to respond to the prompt. Each display device is associated with a particular collection in this manner. Thus, the collections are constructed by a heuristic methodology relative to the non-display devices, and manually relative to the display devices.

14 Claims, 4 Drawing Sheets

SYSTEM AND METHOD FOR CONFIGURING A MULTI-USER COMPUTER SYSTEM

BACKGROUND OF THE INVENTION

1. Technical Field

The present invention relates to a heuristic computer method for configuring collections of input and output devices for multi-user computer systems, particularly when all input and output devices are connected directly to the server computer.

2. Prior Art

In order to provide a computer interface to a human operator, a collection of input and output devices are required. This collection will typically include a video display, a mouse and a keyboard. Optionally, this collection will also include additional devices, such as speakers, microphones, floppy disk drives, CD-ROM drives and additional keyboard devices. For a single user computer, all devices are included in a single collection. For a multi-user system, there will be more than one collection, one for each user. Some method must be used to determine the configuration of these multiple collections.

In a traditional multi-user system, the collections of input and output devices are combined at time of manufacture in a device known as a terminal. This device is separate and distinct from the multi-user server. The multi-user server communicates via a network or serial connection to the terminal. The terminal contains a single collection of user interface devices and is responsible for managing them.

As an alternative architecture for a multi-user system, all input and output devices are connected directly to the multi-user server. Since there are no intervening terminals to manage the input/output devices, server software must be responsible for organizing the input and output devices into multiple collections.

These input/output devices are connected to the computer using internal data-transfer mechanism known as a bus. The most common hardware configuration is for the display devices to be present on the Peripheral Common Interchange (PCI) or Accelerated Graphics Port (AGP) bus while all other input/output peripherals are on the Universal Serial Bus (USB). There may be one or more audio devices on the PCI bus. There also may be a PS/2 keyboard and a PS/2 mouse, which can be connected to the computer using a variety of system architectures, or a mouse connected to the computer via the serial port. Any method for configuring collections of input/output devices must include all of these devices.

Currently the method for configuring the collection is a user interface that requires a multi-step process. The first requires a user to define a collection of input/output devices. The second step is for the user to identify the devices that will be placed in the collection. Each device is identified and assigned individually. This procedure is then repeated until all collections have been configured.

3. Objects and Advantages

It is a principal object and advantage of the present invention to provide a multi-user system configuration method that may be accomplished with less manual instruction relative to the prior art.

It is another object and advantage of the present invention to provide a multi-user configuration method that may be implemented by individuals without any specialized computer training.

It is a further objects and advantage of the present invention to provide a multi-user configuration method that reduces the possibility of user error.

It is still a further object and advantage of the present invention to provide a multi-user configuration method that permits the addition of optional and non-standard input/output devices to a collection without additional user actions.

Other objects and advantages of the present invention will in part be obvious, and in part appear hereinafter.

SUMMARY OF THE INVENTION

In accordance with the objects and advantages, the present invention provides a method of configuring collections of input and output devices on multi-user computer system. The method generally involves the following steps:

a. automatically creating at least two collections of non-display devices by analyzing connection patterns of each of the non-display devices to the computer data buses;

b. providing at least two display devices to the system;

c. displaying a first user input prompt on a first of the display devices;

d. manually responding to the first prompt through a first one of the non-display devices;

e. adding the first display device to the same collection as the first of the non-display devices used in providing the response in step d above;

f. displaying a second user input prompt on a second of the display devices;

g. manually responding to the second prompt through a second one of the non-display devices;

h. adding the second display device to the same collection as the second of the non-display devices used in providing the response in step g above; and i. sequentially continuing steps f, g, and h until each of the display devices are assigned to one of the collections, whereby all of the collections of input and output devices are configured.

The system of the present invention includes cooperative software and hardware for accomplishing each of the process steps.

BRIEF DESCRIPTION OF THE DRAWINGS

The present invention will be more fully understood by reading the following Detailed Description in conjunction with the accompanying drawings, in which.

DETAILED DESCRIPTION OF THE INVENTION

The present invention provides a heuristic method for a user to configure collections of human input and output devices on a computer system. On a multi-user system, there is one collection, one collection for each user. As a minimum requirement, each collection will contain a display device and a keyboard device. The collection may also contain a mouse device, additional keyboard devices, speakers, microphones, as well as other input and output devices.

Figure 1:
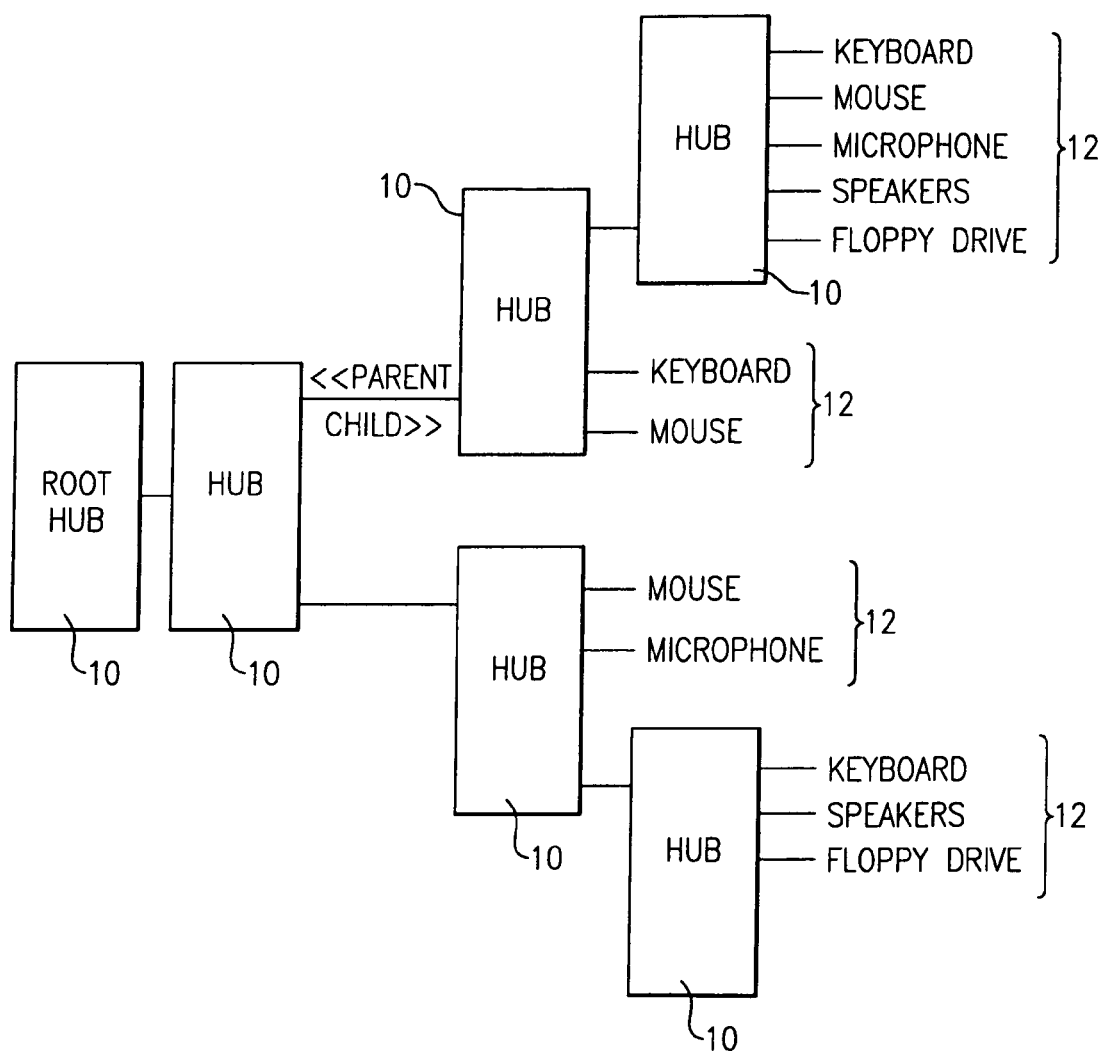
FIG. 1 is a schematic representation of a USB configuration using hubs.

Before the collections are configured, the system administrator must manually connect all of the input and output devices, designated generally by reference numeral 10. USB devices are connected using USB hubs 12, as illustrated in FIG. 1. A USB hub is a device that permits the connection of multiple USB devices 10 to a single USB connection. USB hubs 12 can be interconnected in a daisy-chain configuration (FIG. 1). When connecting the input and output devices 10, all USB devices that are to be included in a particular collection are connected to a unique chain of USB hubs. The grouping of USB devices 10 does not in itself constitute a complete collection as it lacks the essential element of a display adapter.

Figure 3:
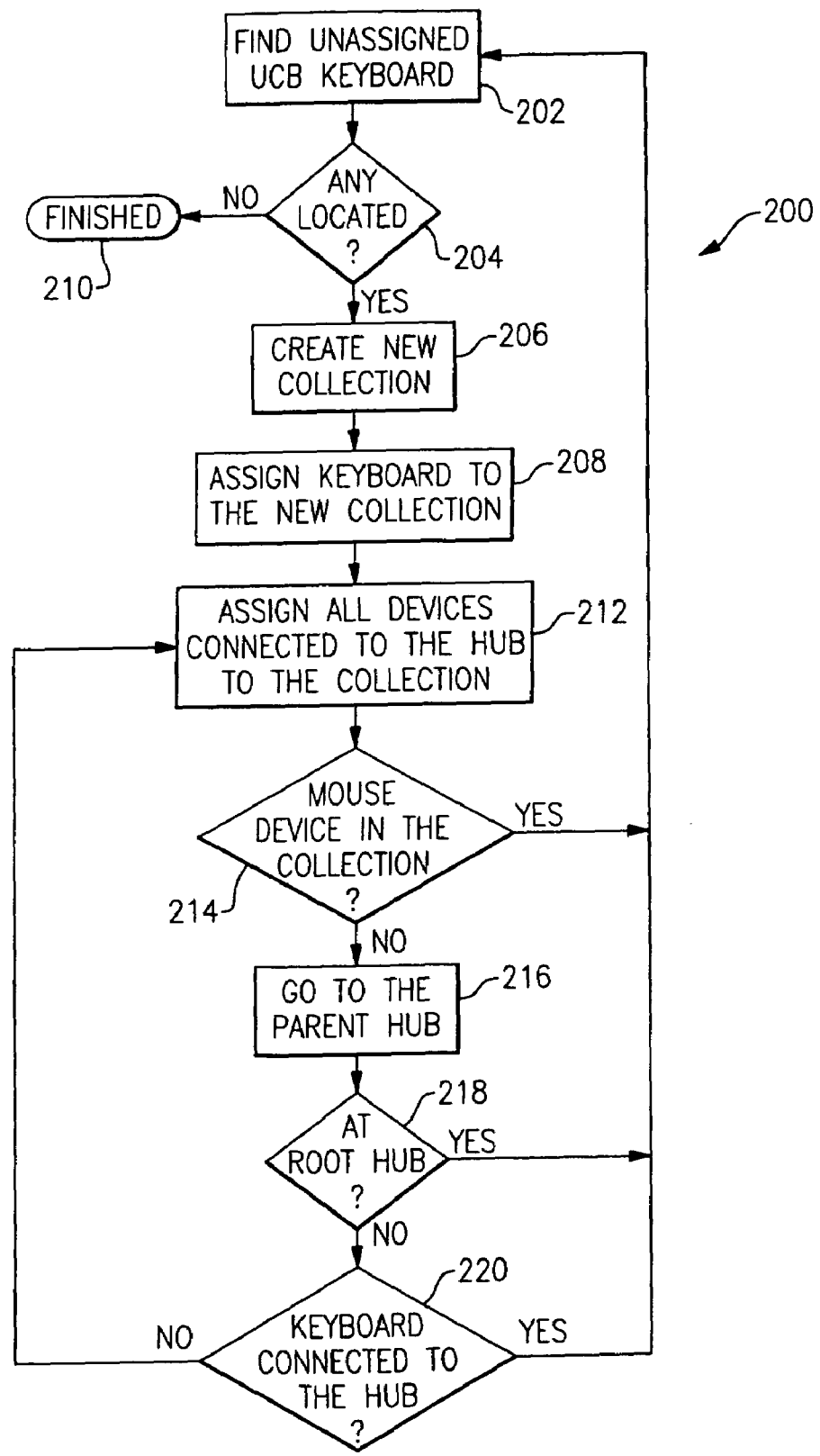
FIG. 3 is an intermediate level flow chart of step 2 of the present invention.
Figure 4:
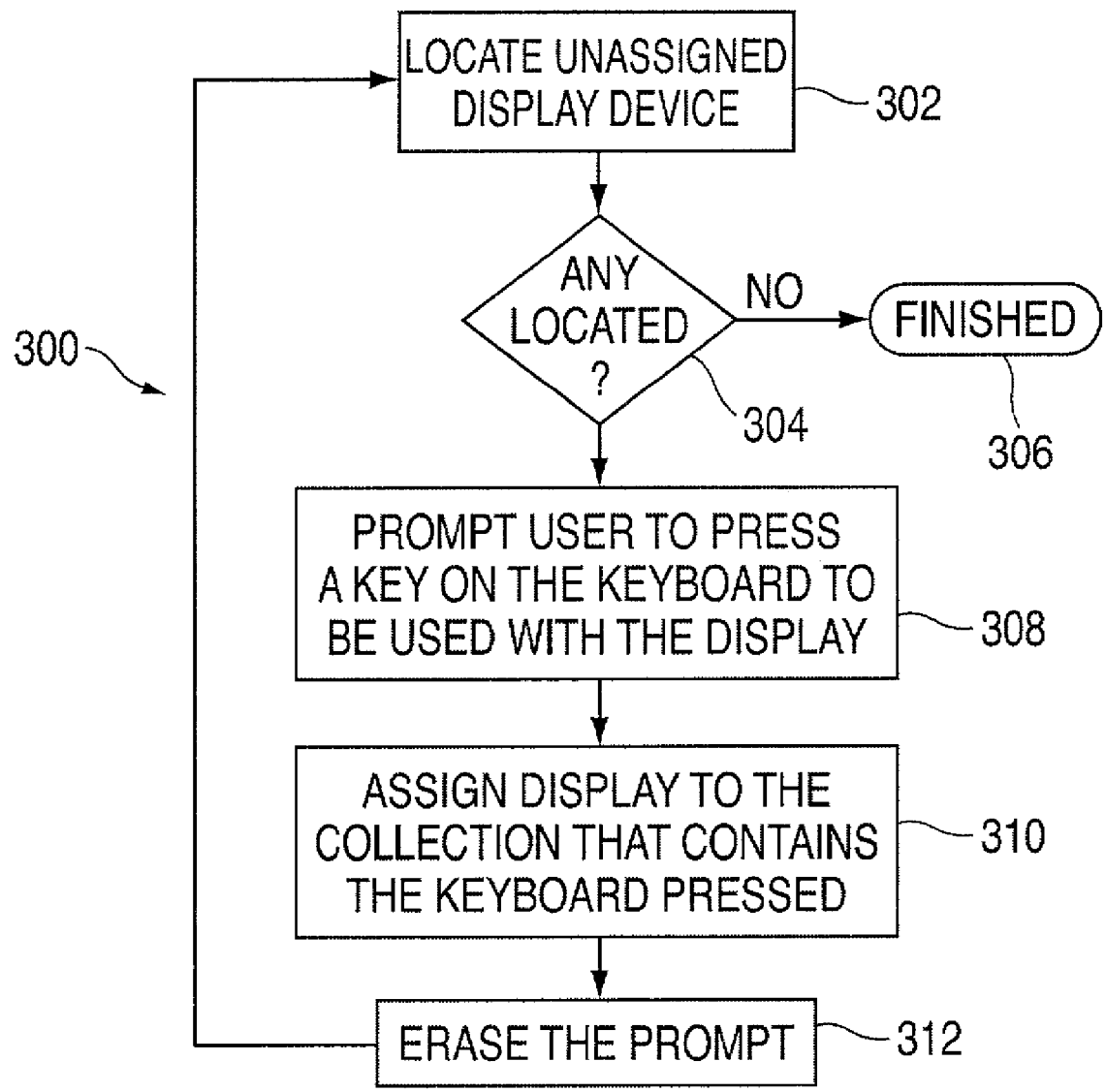
FIG. 4 is an intermediate level flowchart of step 3 of the present invention.

The configuration method of the present invention is then applied to the system. There are three steps to the method, as generally illustrated in FIGS. 2–4.

Figure 2:
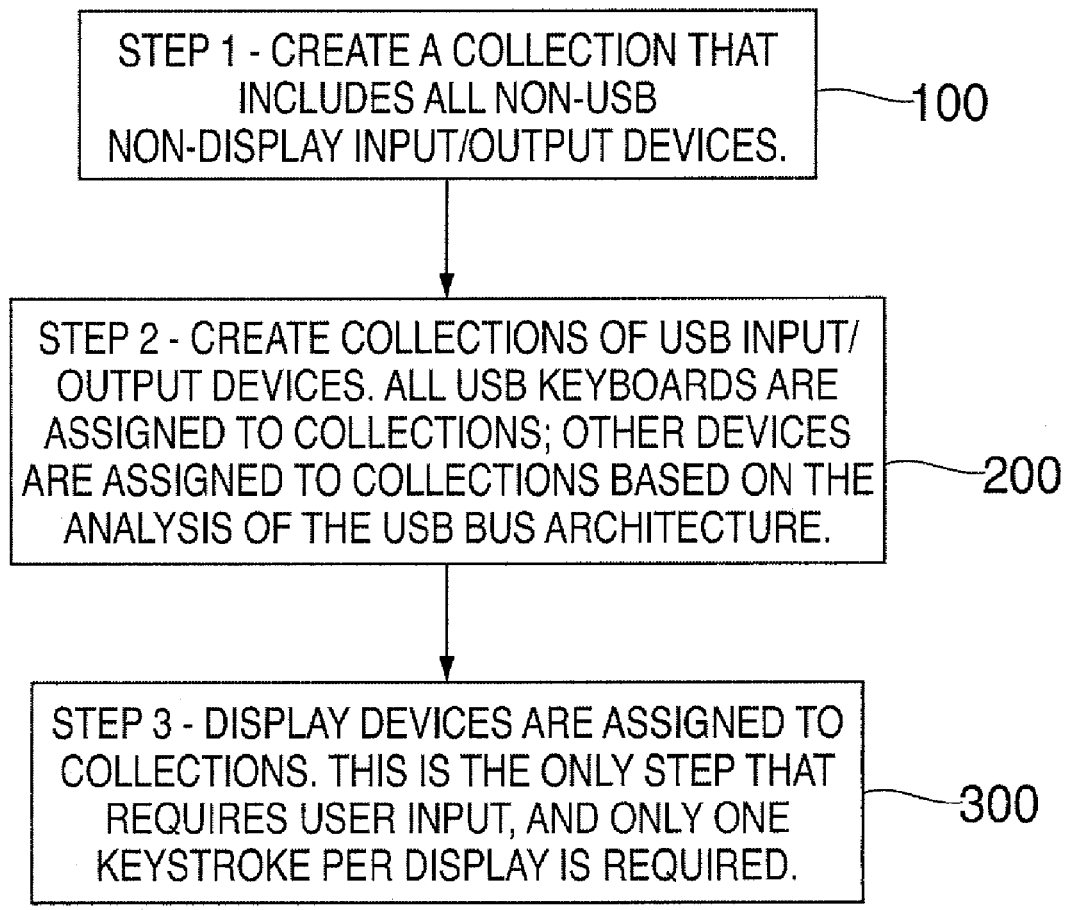
FIG. 2 is a high level flow chart of the present invention.

The first two steps 100 and 200, as illustrated in FIG. 2, represent a heuristic method to assign all non-display devices to collections. These steps proceed automatically without any user input required. The first step 100 is to assign non-USB devices to a collection. An initial collection is created for all non-USB, non-display input/output devices that are connected to buses other than the USB bus.

The second step 200 is to assign the devices 10 connected via the USB bus. These devices 10 are configured into one or more collections. This is done by taking advantage of the USB bus configuration that results from the physical connection of USB input and output devices at a user work location.

Since the user requires more than one USB input and output device, one or more USB hubs are employed to physically connect the USB devices as illustrated in FIG. 1. The software analyzing the USB bus architecture can then associate these devices.

The system and method for configuring the collection of input/output devices assumes two required devices: a USB keyboard and a USB mouse. First, the software causes a USB keyboard to be located 202. If a keyboard is located, 204 then a new collection is created 206 with the keyboard as the first device 208. Otherwise, the process stops, 210. All input and output devices 10 that are connected to this hub 12 are also automatically added to the collection 210. If there is a mouse device in the collection 214, this collection is assumed to be complete with the exception of the display device.

If no mouse is present, then the parent hub of this hub is located 216. If the root hub is encountered 218, the scan for related input/output devices terminates, and if the hub contains a keyboard device 220, then the scan for related input/output devices terminates. If not, all input/output devices connected to the hub are added to the collection. If one of the devices is a mouse device, the scan for related input/output devices terminates. If none of these conditions are met, the parent hub of this hub is once again located. The process is repeated until another keyboard or mouse device is located or the root hub is encountered. At the conclusion of this analysis the configuration of the collection is complete. The USB bus is then scanned for another keyboard device. If one is found, another collection is created. The same bus analysis is performed for this keyboard, generating another collection of input/output devices. This process is completed until all USB keyboards have been located and a collection defined for each one.

At this point multiple collections of incomplete collections have been created. There is one collection for each keyboard device connected to the system. Each collection, however, lacks a display device. This is because display devices can only be connected to the AGP or PCI bus, not the USB bus. Therefore there is no heuristic rule that can associate a display device with a collection based on data bus analysis. The third and final step is to solicit user input to assign the display devices, as illustrated in FIG. 4.

Since all devices have been grouped into collections that include a keyboard device, it is only necessary to associate the keyboard device with a monitor to complete the collection. This configuration method requires only one keystroke per collection. The AGP and PCI buses are instructed by the software to scan for display devices. When the first display device is encountered, 304, a user prompt is displayed requesting the user to press a key on the keyboard device, 308. When the key is pressed, the keyboard generating the key event is identified. The display device displaying the prompt is then assigned to the collection that contains the keyboard device, 310. The display prompt is cleared 312. The AGP and PCI busses are then scanned for the next display device 302. The user prompt is displayed on this device, 306, and the process is repeated. This continues until all display devices are assigned to collections.

Some other user input event, such as a mouse click or voice command, can be substituted for the keyboard event. The remaining logic remains the same with the display device assigned to the collection that contains the input device that generated the event.

At the end of the third step of the process, all input and output devices have been assigned to collections. Each collection contains the devices that will be used by one user of the multi-user system.

What is claimed is:

1. A method to configure a collection of input and output devices on a multi-user computer-system, comprising the steps of:
    a) providing a multi-user computer;
    b) providing a plurality of non-display input and output devices, including at least a mouse and a keyboard for each of a plurality of computer users;
    c) attaching each of said computer users' non-display input and output devices to data buses on a multi-user computer;
    d) analyzing a Universal Serial Bus (USB) bus architecture of said multi-user computer to automatically find and associate each of said computer users' non-display input and output devices attached directly to said USB bus architecture into one or more collections of non-display input and output devices;
    e) attaching a display device to said multi-user computer for each collection of non-display input and output devices;
    f) displaying a user input prompt on one of said multi-user computer display devices;
    g) responding to said user input prompt with a user input event from one of said collections of non-display input and output devices intended to function with said user input prompt displayed on one of said multi-user computer display devices;
    h) assigning said displayed user input prompt to said collection associated with said manual response to add said display to said collection for said user that manually responded to said input prompt; and
    i) sequentially continuing steps f, g, and h until each one of said display devices are assigned to one of said collections and all of said collection of said input and output devices are configured.

2. The method of claim 6 wherein the step of said analyzing said USB bus architecture comprises analyzing multi-user computer data bus chain including at least one Universal Serial Bus (USB) hub to interconnect said computer data buses, to automatically find and associate each of said computer users' non-display input and output devices attached directly to said data bus chain as a collection of non-display input and output devices.

3. The method of claim 6 wherein the step of providing said plurality of non-display input and output devices comprises providing said plurality of non-display input and output devices including at least one device selected from the group of devices consisting of a keyboard, a mouse, a microphone, a speaker, a floppy disk drive, and a printer.

4. The method of claim 1 wherein the step of said responding to said user input prompt with a user input event comprises responding to said user input prompt with a user input event from one of said collections of non-display input and output devices intended to function with said user input prompt displayed on one of said multi-user computer display devices and the user input event is a keyboard entry.

5. The method of claim 1 wherein the step of said responding to said user input prompt with a user input event comprises responding to said user input prompt with a user input event from one of said collections of non-display input and output devices intended to function with said user input prompt displayed on one of said multi-user computer display devices and the user input event is a voice command spoken into a microphone device.

6. The method of claim 1 wherein the step of said responding to said user input prompt with a user input event comprises responding to said user input prompt with a user input event from one of said collections of non-display input and output devices intended to function with said user input prompt displayed on one of said multi-user computer display devices and the user input event is a mouse click.

7. A method of configuring a collection of input and output devices on a multi-user computer system, comprising the steps of:
   a) providing a multi-user computer including a multi-user computer Universal Serial Bus (USB) bus;
   b) providing non-display input and output devices for each one of two or more computer users, at least a first one of said computer users having non-display input and output devices which are non-Universal Serial Bus (USB) devices;
   c) attaching a first user's non-USB devices to a non-USB bus on a multi-user computer;
   d) attaching at least a second computer user's non-display input and output devices including at least a keyboard and a mouse to a chain of USB hubs connected to said USB bus on said multi-user computer;
   e) automatically associating said first user's non-USB devices as a collection for said first user;
   f) analyzing said multi-user computer USB bus chain of USB hubs to automatically associate said two or more computer users' devices as collections of said non-display devices to find said chains of USB hubs and to associate said non-display devices into two or more collections attached directly to said USB chain;
   g) attaching a display device to said multi-user computer for each one of said collection of non-display devices;
   h) displaying a user input prompt on one of said display devices;
   i) responding to said user input prompt with a user input event from one of said collections intended to function with said display from step h;
   j) assigning said display device from step h and i to said collection from step i; and
   k) sequentially continuing steps h, i, and j until each one of said display devices are assigned to one of said collections, such that all of said collection of said input and output devices are configured.

8. The method of claim 7, wherein the step of said attaching at least a second computer user's non-display input and output devices comprises attaching at least a second computer user's non-display input and output devices including at least a keyboard and a mouse to a chain of USB hubs connected to a USB bus on said multi-user computer and at least one of the non-display input and output devices selected from the group of devices consisting of a keyboard, a mouse, a microphone, a speaker, a floppy disk drive, and a printer.

9. The method of claim 7 wherein the step of said responding to said user input prompt with a user input event comprises responding to said user input prompt with a user input event from one of said collections intended to function with said display from step h and the user input event is a keyboard entry.

10. The method of claim 7 wherein the step of said responding to said user input prompt with a user input event comprises responding to said user input prompt with a user input event from one of said collections intended to function with said display from step h and the user input event is a voice command spoken into a microphone device.

11. The method of claim 7 wherein the step of said responding to said user input prompt with a user input event comprises responding to said user input prompt with a user input event from one of said collections intended to function with said display from step h and the user input event is a mouse click.

12. A system for configuring collections out of a first plurality of input and output non-display devices and a second plurality of display devices on a multi-user computer that utilizes a plurality of computer data buses, comprising:
   a) means for automatically analyzing said data buses and associating said first plurality of non-display devices into individual collections for each of at least two users when each of said first plurality of non-display devices in said collections attached to a non-Universal Serial Bus (USB) bus or USB chain that is attached to a said multi-user computer;
   b) means for displaying a first user input prompt on a first of said display devices;
   c) means for adding said first of said display devices to the same said collection as said first plurality of said non-display devices used in responding to said first user prompt; and
   d) means for adding a second or greater of said second plurality of display devices to said collections of said first plurality of said non-display devices used in responding to successive user prompts.

13. The system according to claim 12, wherein said non-display devices include keyboards.

14. The system according to claim 12, wherein said non-display devices include at least one of the non-display input and output devices selected from the group of devices consisting of a keyboard, a mouse, a microphone, a speaker, a floppy disk drive, and a printer.

* * * * *